United States Patent [19]
Lambert

[11] 4,187,745
[45] Feb. 12, 1980

[54] WIRE STRIPPER

[75] Inventor: Roger T. Lambert, Fridley, Minn.

[73] Assignee: Omnetics, Inc., Minneapolis, Minn.

[21] Appl. No.: 903,858

[22] Filed: May 8, 1978

[51] Int. Cl.² ............................................. H02G 1/12
[52] U.S. Cl. .................................................... 81/9.51
[58] Field of Search ............................. 81/9.5 B, 9.51

[56] References Cited

U.S. PATENT DOCUMENTS

| | | | |
|---|---|---|---|
| 2,826,871 | 3/1958 | Baker | 81/9.51 X |
| 2,880,635 | 4/1959 | Harris | 81/9.51 |
| 3,135,145 | 6/1964 | Trethewey et al. | 81/9.51 |
| 3,706,242 | 12/1972 | Wright et al. | 81/9.51 |
| 3,810,289 | 5/1974 | Hannabery | 81/9.51 X |
| 3,838,612 | 10/1974 | Inami | 81/9.51 |
| 3,881,374 | 5/1975 | Gudmestad | 81/9.51 |
| 3,918,330 | 11/1975 | Blaha | 81/9.51 |
| 3,921,472 | 11/1975 | Gudmestad et al. | 81/9.51 |
| 3,929,041 | 12/1975 | Blaha | 81/9.51 |
| 3,951,016 | 4/1976 | Gudmestad et al. | 81/9.51 |

OTHER PUBLICATIONS

"Precision Powered Wire Stripping Equipment"; Carpenter Mfg. Co., Inc., Manlius, New York; 1968.

*Primary Examiner*—James G. Smith
*Attorney, Agent, or Firm*—Schroeder, Siegfried, Ryan, Vidas, Steffey and Arrett

[57] ABSTRACT

A wire stripper having flat arcuately shaped blades pivotally mounted upon one end of a rotor rotatably mounted on a frame, with their axes of pivot being parallel and spaced relative to the axis of rotation of the rotor and located to cause centrifugal force to urge them to noncutting position. A shiftable sleeve telescopically carried by the rotor bears a cam which moves the blades to cutting position on opposite sides of the axis of the rotor along which the wire is presented by a pair of substantially parallel horizontal clamping arms. These arms are mounted for pivotal movement on the frame about a pair of spaced vertical axes of pivot and have terminal wire gripping portions which are alternately received in a wire-length gauge and an opening in the frame which is entered at the axis of the rotor, to present the desired length of wire to the cutting blades at the very axis of the rotor.

29 Claims, 10 Drawing Figures

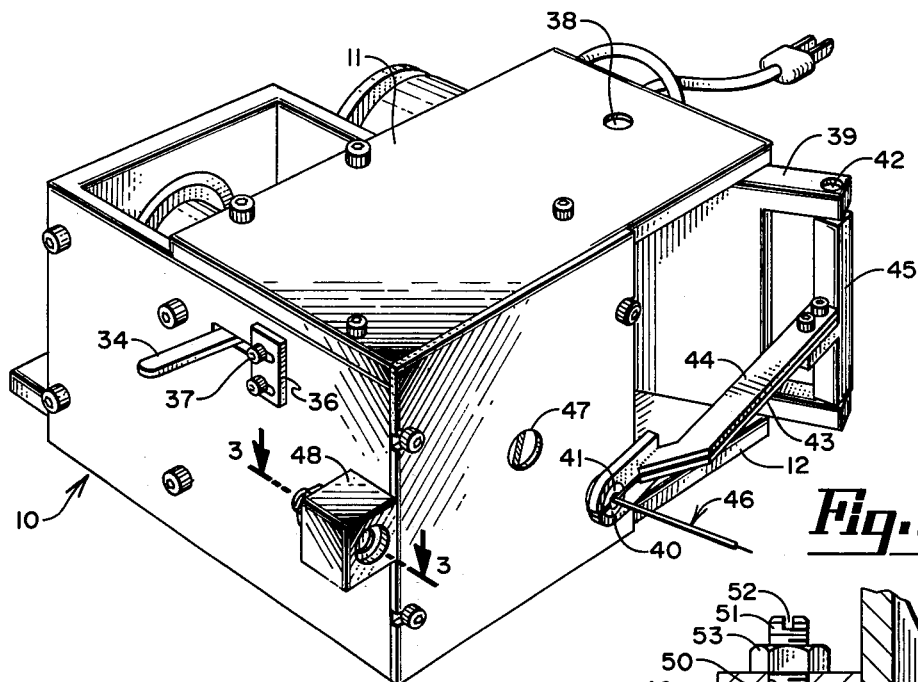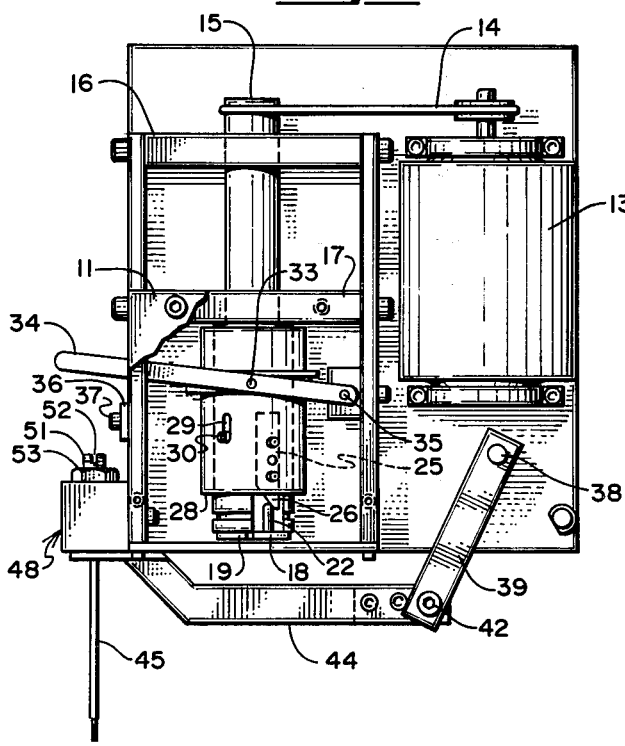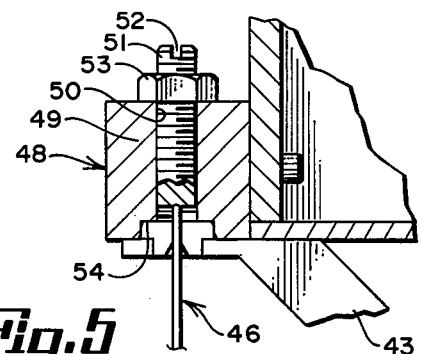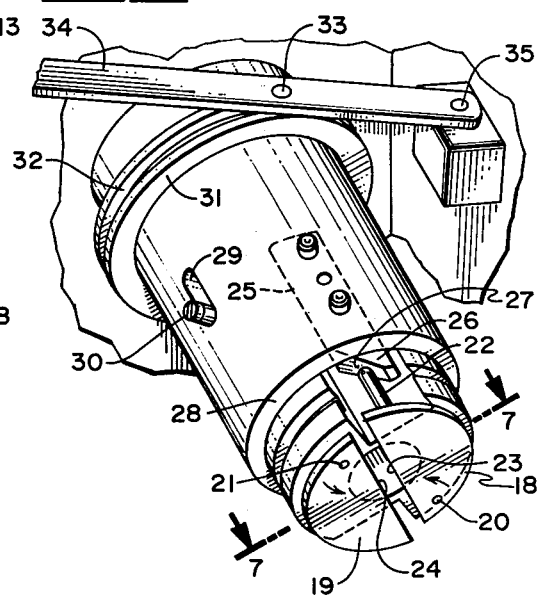

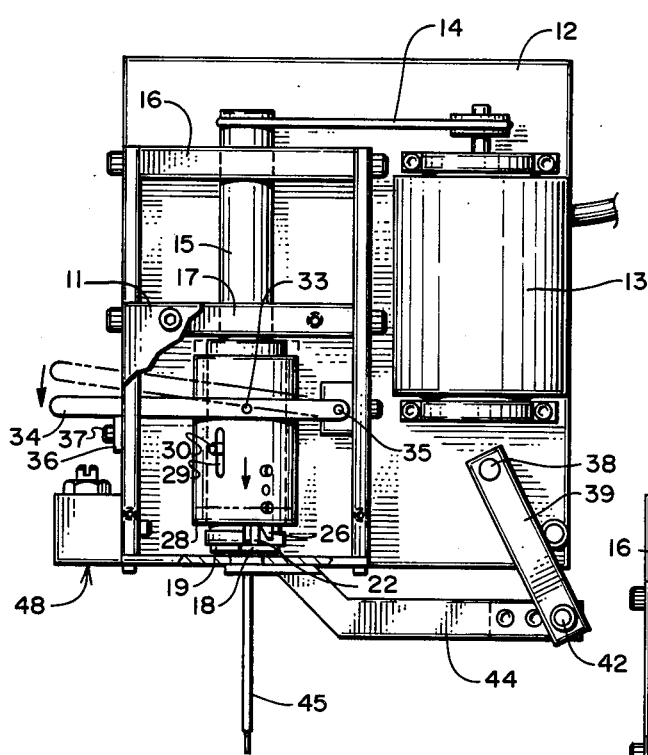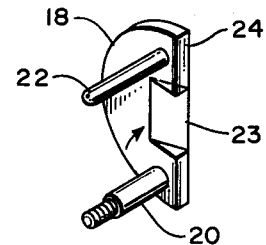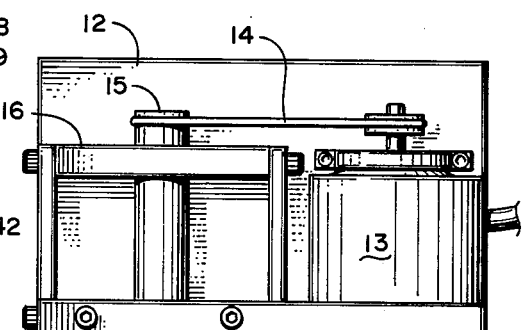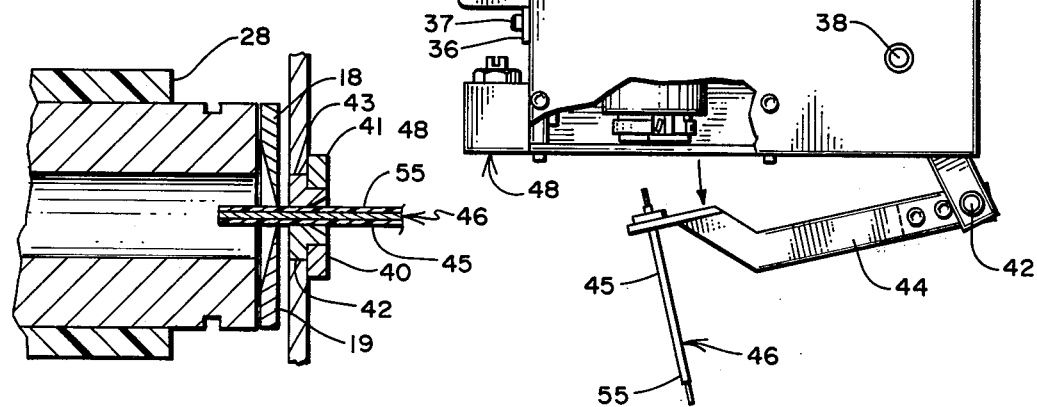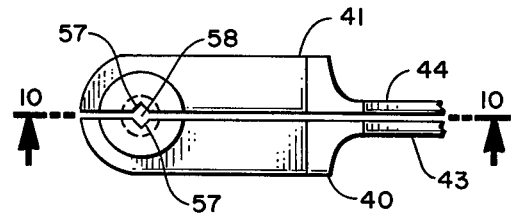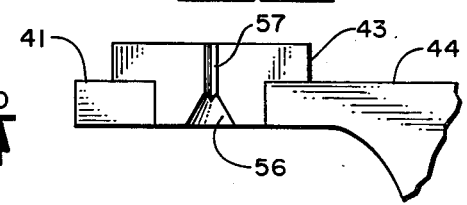

WIRE STRIPPER

There is a definite current need in the industry for a wire stripper capable of effectively stripping terminal portions of prescribed length from wires, without damage to the wire core. This is particularly true with respect to relatively fine wires which are frequently comprised of 7-19 relatively fine metal strands which are twisted into a single wire core that is coated with the conventional insulation coating. It is imperative in connection with the stripping of terminal portions of such small wires that the conducting core not be nicked during the wire stripping operation, because vibrations and other movements cause such nicked wires to break at the point at which they have been damaged. Such damage is frequently caused by conventional wire stripping devices because the device is unable to present and hold the wire in true axial relation to a rotating core which carries the cutting mechanism for severing the coating, preparatory to pulling the terminal portion of coating off the core. It is sometimes caused by the fact that the insulation coating of such wires is frequently not uniform and, therefore, such stripping devices are necessarily manufactured with wide tolerances in the wire receiving portions. As a result, the length of wire to be stripped is not presented to the cutting mechanism on a true axial line relative to the rotor which carries the cutting mechanism. Consequently, such devices are unable to perform the insulation cutting operation within the required tolerances. Non-precisely controlled movement of the cutting edges may also result in such damage to the wire core.

From the above, it can be seen that it is imperative that the stripping action be held to very close tolerances as to the depth of cut and the location of the cut relative to the center of the wire. If the wire is not presented at the center of the circular path of the cutting edges, the cut will be too deep. If the wire is not held firmly, it is free to move radially with consequent damage to the electrical conductor.

There is also a definite need in the industry for a wire stripper which is capable of stripping very short terminal portions off of such fine wires, particularly for miniature sized electrical components in which any appreciable exposed terminal portion of a connector substantially increases the likelihood of a short circuit resulting from a small and loose piece of metal within the device's housing.

It is a general object of my invention to provide a novel and improved wire stripper of simple and inexpensive construction capable of substantially improved operation.

A more specific object is to provide a novel wire stripper capable of stripping terminal portions of relatively fine wire with improved efficiency so as to avoid damage to the electrical connector.

Another object is to provide an improved wire stripper capable of stripping very short terminal lengths of insulation from electrical wires.

Another object is to provide a novel wire stripper capable of accurately and repeatedly stripping a predetermined length of coating from the terminal portion of wires at a relatively rapid rate and without damage to the electrical connector even though its diameter may be very small.

These and other objects and advantages of my invention will more fully appear from the following description, made in connection with the accompanying drawings, wherein like reference characters refer to the same or similar parts throughout the several views, in which:

FIG. 1 is a perspective view of a preferred embodiment of my invention as the wire is initially received thereby;

FIG. 2 is a top plan view thereof with the major portion of the cover member broken away with the wire inserted into the length-gauge;

FIG. 3 is a horizontal sectional view taken on an enlarged scale along line 3—3 of FIG. 1;

FIG. 4 is a top plan view of the same with the major portion of the cover member broken away, and the wire-engaging mechanism shown presenting a length of wire to the blade mechanism for stripping thereby;

FIG. 5 is a fragmentary perspective view, on an enlarged scale, of the rotor which carries the cutting blades and the control sleeve;

FIG. 6 is a perspective view on an enlarged scale of one of the blade members;

FIG. 7 is a vertical sectional view on an enlarged scale taken through the end of the rotor, blade mechanism, and wire-engaging jaws;

FIG. 8 is a top plan view of the device with a portion of the cover member broken away and showing the wire gripping jaws holding a length of wire immediately after the terminal portion has been stipped therefrom;

FIG. 9 is a fragmentary side elevational view on an enlarged scale of the side of the wire gripping jaws adjacent the cutting blades; and FIG. 10 is a sectional view on an enlarged scale taken along line 10—10 of FIG. 9.

The preferred embodiment shown in FIGS. 1-8 includes a box-like metal frame 10 having a cover member 11 and a bottom panel 12, the latter supporting an electric motor 13. A belt 14 connects the motor 13 in driving relation with an elongated shaft or rotor 15 which is mounted upon the frame 10 for rotation about its longitudinal axis in bearing plates 16 and 17. The free terminal portion of the rotor 15 at its end opposite that engaged by the belt 14 has a central bore, as shown in FIG. 7.

Mounted on the free end of the rotor 15 is a pair of oppositely arranged pivotal blades 18 and 19. Each of these blades 18, 19 is pivotally mounted upon the free end of the rotor 15 by one of pivot pins 20, 21 respectively, which is secured into the free end of the rotor at points equidistantly and oppositely located relative to the rotor axis. Each of the blades is freely rotatable about the axis of its associated pivot pin and has a camming post, such as indicated in FIG. 6 and identified by numeral 22, which extends axially toward the rotor.

Each of the blades 18, 19 has an opposite disposed cutting edge 23, 24 respectively, which, as best shown in FIG. 7, is spaced radially outwardly of the end of the rotor and is positioned at oposite sides of its axis. Pivotal movement of the blade members about the pivots 20, 21 causes the blade members to move from cutting position at opposite sides and equidistant from the axis of the rotor as shown in FIGS. 5 and 7 to a retracted, non-cutting position and vice versa. Each of the blade members has a leading portion as indicated by the numeral 24 in FIG. 6, with respect to its direction of rotation, and each tends to swing outwardly, as a result of centrifugal force, to a non-cutting position as will be readily appreciated by reference to FIG. 5. It will be noted that the pivot pins 20, 21 are located at opposite sides of the axis of the rotor and adjacent the peripheral portions of their associated blade member.

The rotor 15 is provided in its circumferential surface with a pair of oppositely disposed ways which extend inwardly from its free end. One of such ways 25 is best shown in FIG. 5. Each of these ways is rectangular in cross-section and carries a camming block 26 which has a camming surface 27 thereon. Each such camming block 26 is fixedly secured to the interior circumferential surface of a sleeve 28 which is slidably carried in telescoped relation by the rotor 15. Each of the camming surfaces 27 is positioned so as to engage an associated camming post 22. Thus, when the sleeve 27 moves outwardly toward the free end of the rotor 15, the camming surface 27 of each of the camming blocks 26 will cam its associated cam follower or post 22 to move the blades to their cutting positions.

The sleeve 28 is provided with an axially extending slot 29 through which a pin 30 that is imbedded in the rotor 15 extends, to thereby drive the sleeve 28 in rotation with the rotor and limit the extent of relative motion therebetween.

Mounted upon the exterior circumferential surface of the sleeve 28 is an annular ring member 31 which has a peripheral groove 32 in its exterior circumferential surface which functions as an annular way. This ring member 31 is secured or made integral, whichever is preferred, with the sleeve 28. A way follower 33 extends into the annular way 32 and is carried by a lever member 34 which is pivotally mounted upon the frame 10 as at 35, so that the annular ring 31 and sleeve 28 may be moved thereby axially of the rotor 15. The outer end of the lever 34 extends outwardly through the side walls of the frame 10, through a slot provided therefor as best shown in FIG. 1. An adjustable abutment block 36 is mounted on the side wall of the frame 10 adjacent one end of the slot by means of adjustment screws 37, as shown in FIG. 1, whereby the extent of movement of the sleeve relative to the rotor may be accurately determined and limited in advance.

Pivotally mounted between the cover member 11 and base panel 12 on an axis of pivot 38 is a pivot block 39 which carries a pair of wire engaging and guiding grip members 40, 41 for pivotal movement about a second vertical axis 42. The gripping jaws 40, 41 are supported by a pair of substantially parallel arms 43 and 44 which are fixedly supported upon a pivot post 45 which pivots about the axis 42. The arms 43, 44 diverge slightly toward their free end adjacent the jaws 40 and 41 so that the latter are normally slightly spaced to enable the same to freely accept a given nominal size wire, accommodating its usual diametral tolerance. These jaws 40 and 41 are mounted on the pivot member 45 at an elevation such that they extend along opposite sides of a plane passing through the axis of the rotor 15, and they each have wire gripping portions which extend substantially concentrically around the axis of the rotor so that when the arms 43, 44 are pressed toward each other to cause the jaws 40, 41 to engage a wire therebetween, that wire 46 will extend substantially axially of the rotor 15. As best shown in FIG. 7, each of the jaws 40, 41 carries an annular shoulder 42, 43 which fits snugly into a circular opening 47 which is centered on the axis of the rotor 15 and formed in the end wall of the frame 10.

Mounted upon the side wall of the frame 10 is a length-gauging device 48 which, as best shown in FIG. 3, is comprised of a block 49 having a central bore 50 which threadedly receives a threaded shaft 51 having an adjustment slot 52 at its outer end. A retainer nut 53 is provided to hold the shaft 51 from turning relative to the block 48 once it has been adjusted to provide the proper depth within the bore 50 as determined by the position of its inner end, as shown in FIG. 3. At the end of the bore adjacent the opening 47, the block 48 is provided with a circular recess 54 which is slightly larger than the opening 47 and has a depth equal to the depth of the shoulders 42, 43 of the gripping arms 40, 41. This can best be seen by reference to FIG. 3 which shows the gripping arms holding a segment of wire positioned within the recess 54.

FIGS. 9 and 10 show the details of the wire-gripping jaws, 40 and 41. As shown, each jaw is normally slightly spaced from the other and has a substantially semi-frusto-conical wire receiving and guiding recess 56 which terminates in a V-shaped channel 57. The opposed channels 57 of the two jaws together form a wire gripping channel 58 which is substantially square in configuration and will engage a wire of any given diameter at essentially four points. The center of that square is on the axis of the rotor 15.

In use, the shaft 52 is adjusted with a screw driver so that its opposite end will abut the length of wire desired to protrude beyond the shoulders 42, 43 of the gripping jaws 40, 41. Once this adjustment has been made, nut 53 is tightened and thereafter it is a simple matter to repeatedly insert the jaws 40, 41 with a wire therebetween into the opening 54 and move the wire inwardly until it abuts against the end of the shaft 51. This is best shown in FIG. 2. Thereafter, the arms 43 and 44 are pressed together, causing the jaws 40 and 41 to clamp the wire 46 firmly therebetween and the jaws are then swung, as shown in FIG. 1, so that the shoulders 42, 43 will be moved into the opening 47, as shown in FIG. 4. This places the wire 46 in the desired position for stripping, which is accomplished by movement of the lever 34, as shown in FIG. 4, to a position against the abutment block 36, thereby moving the sleeve 28 longitudinally of the rotor 15 and causing the camming blocks 26 to cam the blades 18, 19 to cutting position with respect to the wire 46. In this position, the cutting edges 23 of the blades cut the insulated coating 55 of the wire 46 to a depth closely approaching the wire core but not sufficiently deep so as to extend through the coating, leaving a relatively thin interior film of the coating uncut. Withdrawal of the wire 46 by pulling the arms 43, 44 away from the frame while maintaining pressure thereon, causes the blade members to break away the remaining thin film of the insulated coating and pull the terminal portion off the wire core, because the cut portion of the coating bears against the sides of the blades rather than their cutting edges. In this manner, it is assured that the wire core is not nicked or cut. The arms 43, 44 are then released, the stripped wire removed, and the operation is repeated. FIG. 8 shows these elements just prior to such a release with the terminal portion stripped from the wire.

From the above, it will be seen that I have provided a relatively simple and yet novel device for accurately stripping the insulated coating from relatively small wires, such as 28 gauge or smaller, in a precise manner so as to avoid nicking the electrical core, thereby avoiding subsequent faulty performance when utilized in electrical assemblies. It will be seen that even though such wires may have non-uniform thicknesses of electrical insulation, the conducting core will be presented to the cutting mechanism in axial alignment with the rotor, whereby a cut of equal depth by each of the blades to avoid nicking or damage to the conducting core is assured. Through the use of the abutment block 36, the depth of the cut can be accurately predetermined and maintained throughout any desired number of subsequent stripping operations. Through the use of the length gauge device 48, the operator is assured that repeated operations will provide repeated strippings of any desired predetermined length from the terminal portion of the wire. In this connection, it will be noted that through the use of this stripper, it is possible to strip extremely short terminal portions of insulation from the end of such wires because the cutting edges 23 of the blades are axially spaced from the end of the rotor and are in very close proximity to the inner ends of the shoulders 42, 43. In addition, the gripping jaws are designed to hold the wire firmly which enables such short cuts to be made.

It will, of course, be understood that various changes may be made in the form, details, arrangement and proportions of the parts without departing from the scope of my invention which consists of the matter shown and described herein and set forth in the appended claims.

I claim:
1. A wire stripper comprising,
   (a) a frame;
   (b) a rotor mounted on said frame for rotation about its longitudinal axis;
   (c) a motor mounted on said frame and connected to said rotor in rotary driving relation;
   (d) a pair of blade members each pivotally mounted upon one end of said rotor for pivotal movement toward each other into cooperative cutting position at opposite sides of the axis of rotation of said rotor and away from each other to retracted non-cutting position;
   (e) the axis of pivot of each of said blade members extending parallel to the axis of rotation of said rotor and being located at opposite sides thereof;
   (f) each of said blade members being flat and generally semi-circular in shape and having a generally diametrically extending edge and having its axis of pivot adjacent its periphery and its said diametrically extending edge;
   (g) a cutting edge formed on each of said blade members along its said diametrically extending edge opposite the axis of rotation of said rotor;
   (h) a sleeve telescopically carried by said rotor and rotating therewith and being controllably shiftable longitudinally thereof;
   (i) camming means carried by said sleeve in camming engagement with said blade members for pivoting the same when desired into cooperative cutting positions with respect to the axis of rotation of said rotor, whereby the coating on a wire may be cut thereby when the wire is positioned along the axis of said rotor and between said blade members;
   (j) an annular way carried by the outer circumferential surface of said sleeve and extending therearound;
   (k) a lever pivotally mounted on said frame for pivotal movement thereof transversely of said annular way, and
   (l) a way follower carried by said lever and extendinto said way in controlling relation therewith whereby said sleeve and said way and said camming means may be shifted longitudinally of said rotor by pivoting said lever to cam said blade members into said cutting position as and when desired.

2. The structure defined in claim 1, and
   (g) means pivotally mounted on said frame for engaging and presenting a length of coated wire axially of said rotor and between said blade members to cause the latter when moved to cutting position to cut the coating thereon to facilitate stripping a section of the coating therefrom.

3. The structure defined in claim 1, and
   (g) means pivotally mounted on said frame for releasably engaging and presenting a length of coated wire axially of said rotor and between said blade members to cause the latter when moved to cutting position to cut the coating thereon in order to facilitate stripping a section of the coating therefrom;
   (h) means carried by said frame for telescopically and limitedly receiving said wire engaging means therewithin, with the wire engaged thereby extending along the axis of said rotor and between said blade members, and
   (i) length-gauging mechanism carried by said frame adjacent said wire engaging means and constructed and arranged to telescopically receive said wire engaging means therein to thereby gauge the length of a segment of wire which may extend beyond said wire engaging means and consequently the length of a section of coating which will be cut on the wire when said wire engaging means is caused to present that wire between said blade members.

4. The structure defined in claim 2 wherein said wire engaging means is pivotally mounted on said frame for pivotal movement about each of a pair of spaced vertical axes.

5. The structure defined in claim 2 wherein said wire engaging means includes a pair of generally parallel vertically spaced horizontal clamping arms each of which has an opposite free end portion adapted to receive and cooperatively engage a wire therebetween and to extend into said receiving means on said frame and hold the wire when urged toward each other while the coating thereon is cut by said blade members.

6. A wire stripper comprising,
   (a) a frame;
   (b) a rotor mounted on said frame for rotation about the longitudinal axis;
   (c) a motor mounted on said frame and connected to said rotor in rotary driving relation;
   (d) a pair of blade members each pivotally mounted upon one end of said rotor for pivotal movement toward each other into cooperative cutting position at opposite sides of the axis of rotation of said rotor and away from each other to retracted non-cutting position;
   (e) the axis of pivot of each of said blade members extending parallel to the axis of rotation of said rotor and being located at opposite sides thereof and appropriately off-set with respect to the mass of said blade member to cause centrifugal force upon rotation of said rotor to urge said blade member to pivot away from the axis of said rotor to retracted non-cutting position; and
   (f) controllable and shiftable camming means carried by said rotor in camming engagement with said blade members for camming the same when desired into cooperative cutting positions with respect to the axis of rotation of said rotor whereby the coating on a wire may be cut thereby when the wire is positioned along the axis of said rotor and between said blade members.

7. The structure defined in claim 6, and
(g) means pivotally mounted on said frame for engaging and presenting a length of coated wire axially of said rotor and between said blade members to cause the latter when moved to cutting position to cut the coating thereon to facilitate stripping a section of the coating therefrom.

8. A wire stripper comprising,
(a) a frame;
(b) a rotor mounted on said frame for rotation and constructed and arranged to be connected to a source of rotary power for rotation thereby;
(c) cutting mechanism pivotally mounted on said rotor and rotating therewith;
(d) the axis of pivot of said cutting mechanism being disposed in radially spaced relation to the axis of rotation of said rotor and extending parallel thereto;
(e) said cutting mechanism being pivotable in a radial plane relative to said rotor between a retracted non-cutting position relative to the axis of said rotor and a cutting position adjacent said rotor axis; and
(f) means carried by said frame for controllably causing said cutting mechanism to pivot between said positions whereby the coating on a wire may be cut thereby when the wire is positioned along the axis of said rotor opposite said cutting mechanism.

9. The structure defined in claim 8, and
(g) means connected to said frame for presenting a length of coated wire axially of said rotor to said cutting mechanism to cause the latter when moved to cutting position to cut the coating thereon to facilitate stripping a section of the coating therefrom.

10. The structure defined in claim 8 wherein said cutting mechanism is pivotally mounted on the end of said rotor and pivots radially thereof.

11. The structure defined in claim 8, wherein said cutting mechanism includes at least one blade member pivotally mounted on said rotor and pivoting in a radial plane only relative thereto about an axis of pivot spaced from and parallel to the axis of rotation of said rotor.

12. The structure defined in claim 8, wherein said cutting mechanism includes at least one blade member pivotally mounted on said rotor and pivoting about an axis of pivot spaced from and parallel to the axis of rotation of said rotor.

13. The structure defined in claim 8, wherein said cutting mechanism is comprised of a pair of blade members each pivotally mounted upon one end of said rotor and each pivoting about an axis spaced from and parallel to the axis of rotation of said rotor.

14. The structure defined in claim 8, wherein said cutting mechanism is comprised of a pair of blade members each pivotally mounted upon one end of said rotor and each pivoting about an axis spaced from and parallel to the axis of rotation of said rotor, the axes of pivot of said blade members being oppositely located with respect to the axis of rotation of said rotor.

15. The structure defined in claim 8, wherein said cutting mechanism is comprised of a pair of blade members each pivotally mounted upon one end of said rotor and each pivoting about an axis spaced from and parallel to the axis of rotation of said rotor, the axes of pivot of said blade members being located at opposite sides of the axis of rotation of said rotor, each of said blade members having leading portions with respect to its direction of rotation which carries an oppositely facing cutting edge and having its axis of pivot off-set with respect to its mass to cause centrifugal force to urge each of said blade members toward retracted non-cutting position when said rotor is rotated and whereby said cutting edges may be moved into cooperative cutting positions at opposite sides of the axis of said rotor.

16. The structure defined in claim 8, wherein said cutting mechanism includes at least one blade member pivotally mounted on said rotor with its pivot constructed and arranged so that the axis thereof is spaced from but extends parallel to the axis of rotation of said rotor, said blade member having a leading portion with respect to its direction of rotation which carries a cutting edge and its axis of pivot being off-set with respect to its mass to cause centrifugal force to urge said blade member toward retracted non-cutting position when said rotor is rotated.

17. The structure defined in claim 8, wherein said cutting mechanism includes at least one blade member pivotally mounted on said rotor and pivoting about an axis of pivot spaced from and parallel to the axis of rotation of said rotor, and
(g) said blade member having a cutting edge axially spaced from the end of said rotor.

18. The structure defined in claim 8, wherein said cutting mechanism includes at least one blade member pivotally mounted on said rotor and pivoting about an axis spaced from and parallel to the axis of rotation of said rotor, and
(g) a cam follower carried by said blade member in spaced relation to the axis of pivot thereof;
(h) a cam carried by said rotor and shiftable longitudinally of the axis thereof into camming engagement with said cam follower to cause said blade member to be cammed into cutting position; and
(i) mechanical control means connected with said cam for controlling its said movement longitudinally of the axis of said rotor between camming and non-camming positions.

19. The structure defined in claim 8,
(g) a sleeve carried by said rotor in encircling relation and rotating therewith;
(h) said sleeve being controllably shiftable longitudinally of said rotor;
(i) a cam follower carried by said cutting mechanism in spaced relation to the axis of pivot thereof; and
(j) a cam carried by said sleeve and shifting therewith between camming and non-camming position with respect to said cam follower whereby said cutting mechanism may be controllably cammed into cutting position with respect to the axis of said rotor when said sleeve is shifted in one direction longitudinally thereof.

20. The structure defined in claim 8, and
(g) means pivotally mounted on said frame for releasably engaging and presenting a length of coated wire axially of said rotor and between said blade members to cause the latter when moved to cutting position to cut the coating thereon in order to facilitate stripping a section of the coating therefrom;
(h) means carried by said frame for telescopically and limitedly receiving said wire engaging means therewithin, with the wire engaged thereby extending along the axis of said rotor and between said blade members, and (i) length-gauging mechanism caused by said frame adjacent said wire engaging means and constructed and arranged to telescopically receive said wire engaging means therein to thereby gauge the length of a segment of wire which may extend beyond said wire engaging means and consequently the length of a section of coating which will be cut on the wire when said wire engaging means is caused to present that wire between said blade members.

21. The structure defined in claim 20, wherein said wire engaging means is pivotally mounted on said frame for pivotal movement about each of a pair of spaced vertical axes.

22. The structure defined in claim 20 wherein said wire engaging means includes a pair of generally parallel vertically spaced horizontal clamping arms each of which has an opposite free end portion adapted to receive and cooperatively engage a wire therebetween and to extend into said receiving means on said frame and hold the wire when urged toward each other while the coating thereon is cut by said blade members.

23. The structure defined in claim 8, and (g) means pivotally mounted on said frame for releasably engaging and presenting a length of coated wire axially of said rotor and between said blade members to cause the latter when moved to cutting position to cut the coating thereon in order to facilitate stripping a section of the coating therefrom; and (h) means carried by said frame for telescopically and limitedly receiving said wire engaging means therewithin, with the wire engaged thereby extending along the axis of said rotor and between said blade members.

24. A wire stripper comprising, (a) a frame;

(b) a rotor mounted on said frame for rotation and constructed and arranged to be connected to a source of rotary power for rotation thereby;

(c) cutting mechanism movably mounted on said rotor and rotating therewith;

(d) said cutting mechanism being movable between a retracted non-cutting position relative to the axis of rotation of said rotor and a cutting position adjacent said rotor axis;

(e) means carried by said frame for controllably causing said cutting mechanism to move between said positions whereby the insulation coating on a wire may be cut thereby when the wire is positioned axially of said rotor opposite said cutting mechanism; and (f) wire-engaging-and-guiding mechanism pivotally mounted on said frame for pivotal swinging movement axially of said rotor after positively engaging the wire and constructed and arranged to positively engage and move such a wire axially into a position extending truly axially relative to said rotor and opposite said cutting mechanism.

25. The structure defined in claim 24 wherein said wire-engaging-and-guiding mechanism includes a pair of opposed relatively movable wire-gripping jaws constructed and arranged to cooperatively receive and positively engage a wire therebetween.

26. The structure defined in claim 24 wherein said wire-engaging-and-guiding mechanism includes a pair of normally spaced wire-gripping jaws pivotally mounted on said frame in opposed wire-receiving position and having wire-gripping portions adapted to be moved toward each other to positively engage a wire positioned therebetween;

(g) said jaws being mounted for pivotal movement along opposite sides of a plane extending through the axis of said rotor to a position opposite said cutting mechanism, and (h) means carried by said frame adjacent said cutting mechanism for engaging said jaws and thereby aligning their wire-receiving portions with the axis of said rotor whereby a wire carried between said jaws in their wire-gripping portions will be presented opposite said cutting mechanism and axially of said rotor.

27. The structure defined in claim 24 wherein said wire-engaging-and-guiding mechanism includes (g) a pivot member pivotally mounted on said frame for pivotal movement about a first axis, and (h) a pair of wire-engaging-and-guiding jaws pivotally mounted on said pivot member for pivotal movement about a second axis parallel to said first axis and along opposite sides of a plane extending through the axis of said rotor to a position opposite said cutting mechanism, said jaws having positive wire-gripping portions.

28. The structure defined in claim 27, and (i) means carried by said frame adjacent said cutting mechanism for engaging said jaws and thereby aligning their wire-receiving portions with the axis of said rotor whereby a wire carried between said jaws in their wire-gripping portions will be presented opposite said cutting mechanism and axially of said rotor.

29. The structure defined in claim 27 wherein said jaws are normally spaced relative to each other and are movable transversely of said axes of pivot into wire-engaging positions.

* * * * *

UNITED STATES PATENT AND TRADEMARK OFFICE
CERTIFICATE OF CORRECTION

PATENT NO. : 4,187,745
DATED : February 12, 1980
INVENTOR(S) : Roger T. Lambert

It is certified that error appears in the above-identified patent and that said Letters Patent are hereby corrected as shown below:

In Abstract paragraph, third to the last line, "entered" should be deleted and "centered" should be inserted.

Signed and Sealed this

Twentieth Day of May 1980

[SEAL]

Attest:

SIDNEY A. DIAMOND

Attesting Officer

Commissioner of Patents and Trademarks